3,382,214
VINYL PYRIDINE COPOLYMERS COMPRISING SEGMENTS HAVING HYDROXY SUBSTITUENTS THEREON AND A PROCESS FOR THEIR PREPARATION
Howard C. Haas, Arlington, Mass., assignor to Polaroid Corporation, Cambridge, Mass., a corporation of Delaware
No Drawing. Filed Nov. 18, 1964, Ser. No. 412,252
9 Claims. (Cl. 260—67.5)

ABSTRACT OF THE DISCLOSURE

Vinyl pyridine copolymers comprising segments having hydroxy substituents thereon may be prepared by polymerizing a vinyl pyridine monomer with a comonomer selected from the group consisting of $\alpha,\beta$-unsaturated aliphatic monobasic and dibasic acids, esters of said acids and polymerizable $\alpha,\beta$-unsaturated aliphatic aldehydes; and hydrogenating the acid, ester or aldehyde groups on the resulting copolymer to hydroxy alkyl groups.

---

The present invention is concerned with copolymers of vinylpyridines and, more particularly, with processes for preparing copolymers comprising segments derived from vinylpyridines and segments bearing hydroxy substituents.

Up to the present time, it has been well nigh impossible to prepare copolymers of vinylpyridine with other monomers which will provide significant amounts of hydroxyl groups in the polymeric chain. If one, for example, attempts to prepare such copolymers by polymerizing vinylpyridines with vinylacetate and hydrolyzing the resulting product, it is generally found that, because of a great disparity in monomer reactivities, only negligible amounts of the vinylacetate monomer copolymerize. Similar results are obtained when one attempts to copolymerize vinylpyridines with vinylene carbonate and hydrolyze the resulting product. The present invention is concerned with processes for preparing vinylpyridine copolymers comprising significant amounts of segments bearing hydroxyl substituents.

One object of the present invention is to provide processes for preparing vinylpyridine copolymers comprising significant amounts of segments bearing hydroxyl substituents.

Another object of the present invention is to provide novel polymers which are produced by the processes of the present invention.

Other objects of the invention will in part be obvious and will in part appear hereinafter.

The invention accordingly comprises the process involving the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description.

It has been found in the present invention that vinylpyridine copolymers comprising significant amounts of segments bearing hydroxyl substituents may be prepared by copolymerizing vinylpyridine with at least one comonomer selected from the group consisting of (a) polymerizable $\alpha,\beta$-unsaturated aliphatic monobasic and dibasic acids, and esters of said acids, and (b) polymerizable $\alpha,\beta$-unsaturated aliphatic aldehydes to form a copolymer and hydrogenating the acid, ester or aldehyde groups of the resulting copolymer with a suitable reagent to provide hydroxyalkyl substituents and more particularly hydroxy-lower-alkyl substituents, e.g., less than four carbon atoms on said copolymer.

The following equations illustrate the processes of the present invention:

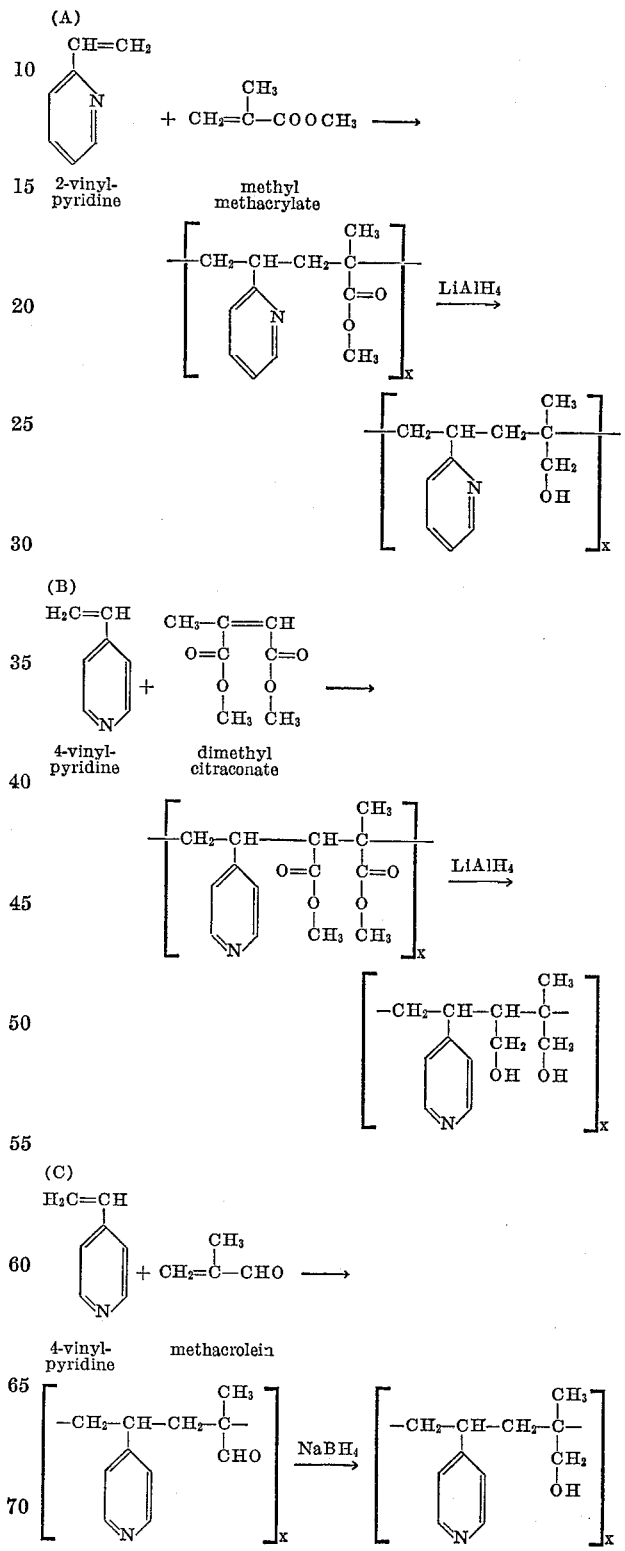

Generally the polymers produced by the processes of the present invention comprise segments which may be represented by the formula:

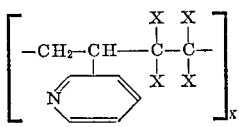

wherein at least one and not more than two of the X's are hydroxyalkyl groups comprising less than four carbon atoms, e.g., hydroxymethyl groups, i.e., HO—CH$_2$— and hydroxyethyl groups (HO—CH$_2$CH$_2$—) and the remainder of said X's are selected from the group consisting of hydrogen and lower alkyls, e.g., containing less than four carbon atoms.

As examples of other polymers which may be produced by the process of the present invention, mention may be made of the following:

(D)

(E)

and (F)

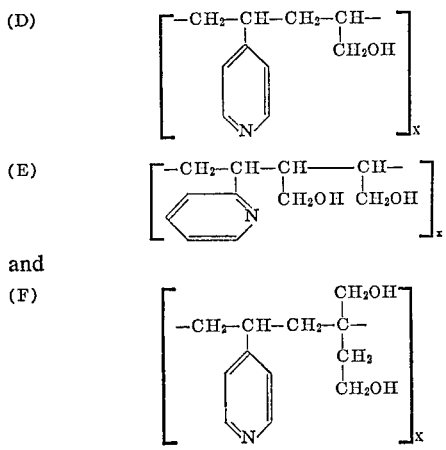

The vinylpyridine and α,β-unsaturated monomers for use in the processes of the present invention may be selected from the various materials of this nature available. As examples of useful vinylpyridines, mention may be made of 2-vinylpyridine, 3-vinylpyridine, 4-vinylpyridine and 2-methyl-5-vinylpyridine. In choosing the acids, esters and aldehydes, it is preferable that such acids, aldehydes and esters (exclusive of the alcohol derived portion of the ester) comprise less than seven carbon atoms. As examples of suitable α,β-unsaturated monomers which may be used to prepare the polymers of the present invention, mention may be made of acrolein, methacrolein, dimethyl maleate, diethyl fumarate, methyl acrylate, ethyl methacrylate, diethyl citraconate, dimethyl itaconate, i.e.,

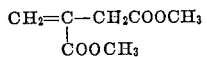

acrylic acid and methacrylic acid. When using an ester, especially useful results were obtained using alkyl esters and, more particularly, alkyl esters in which the alkyl group contains less than seven carbon atoms.

In performing the processes of the present invention, the polymerization step may be carried out by known techniques, e.g., in bulk, solvent, or emulsion systems using commonly employed catalysts such, for example, as azobisisobutyronitrile, benzoyl peroxide, alkyl persulfates, etc. The hydrogenation step, which usually proceeds at room temperature, is preferably carried out at a slightly elevated temperature, e.g., 50 to 75° C.; also, it is preferably carried out in an inert solvent (i.e., a solvent which is not reactable with the polymers or with the reducing reagent). Dry pyridine was found to be a particularly useful solvent for this purpose.

The reduction (hydrogenation) of the acid ester and aldehyde groups to hydroxyalkyl groups may be carried out by known reagents such, for example, as the alumi- num and boron hydrides. Suitable reagents of this type are disclosed in Reduction With Complex Metal Hydrides, by M. G. Gaylord, Interscience Publishers, New York, New York, 1956, and The Mixed Hydrides by Mark N. Revick, distributed by Metal Hydrides Incorporated, Beverly, Massachusetts. As examples of such hydrides which are particularly useful in reducing the acid, ester and aldehyde groups, mention may be made of lithium aluminum hydride, LiAlH$_4$; lithium borohydride, LiBH$_4$; mixtures of aluminum and boron hydrides with aluminum chloride, such as aluminum hydride with aluminum chloride, AlH$_3$·AlCl$_3$, a mixture of sodium borohydride and aluminum chloride, NaBH$_4$·AlCl$_3$, and a mixture of lithium aluminum hydride and aluminum chloride, LiAlH$_4$·AlCl$_3$; alkoxy metal hydrides, such as sodium trimethoxyborohydride, NaBH(OCH$_3$)$_3$ and sodium triethoxyaluminumhydride, NaAlH(OCH$_2$CH$_3$)$_3$; and mixtures of sodium borohydride and dialkoxyaluminum chloride, such as sodium borohydride with dimethoxyaluminum chloride, NaBH$_4$·AlCl(OCH$_3$)$_2$. When the group to be reduced is an aldehyde, reagents such, for example, as sodium and potassium borohydride may also be employed. The preferred reducing reagent is lithium aluminum hydride.

The following non-limiting examples illustrate the processes of the present invention.

Example 1

10.5 gm. of distilled 4-vinylpyridine and 17.2 gm. of diethyl maleate were dissolved in 30 ml. of benzene containing 0.083 gm. of azobisisobutyronitrile. The solution was sealed under vacuum and heated at 70° C. for 20 hours. The resulting copolymer of 4-vinylpyridine and diethyl maleate precipitatetd out and was purified by reprecipitation from ethanol into ether. The yield was 8.2 gm.

7 gm. of the copolymer of 4-vinylpyridine and diethyl maleate produced above was dissolved in 50 ml. of dry pyridine and treated with 0.5 gm. of lithium aluminum hydride. After 30 minutes, the polymer that precipitated was washed with ethylacetate, dried, and dialyzed overnight. The yield was 3 gm. of a copolymer of 4-vinylpyridine and 2,3-butene diol, comprising 10 mole percent of the diol segment.

Example 2

10.5 parts of 4-vinylpyridine, 7.0 parts of methacrolein, 0.125 part of benzoyl peroxide and 1.25 parts of sodium di-(2-ethylhexyl)phosphate, which is an emulsifying agent sold under the trade name Tergitol P–28, were added to 125 parts of water and agitated under nitrogen for four hours at 60° C. The reaction mixture was coagulated by freezing and the resulting copolymer was purified by reprecipitation from ethanol into water. 4.35 parts of the copolymer in 25 ml. of pyridine was added dropwise to a mixture of 0.95 gm. of sodium borohydride in 40 ml. of pyridine and stirred for four hours at 65° C. The resulting mixture was added to an equal volume of water and was dialyzed overnight with running water. The resulting polymer, which precipitated out during dialysis, was washed with acetone and dried. 2 gm. of copolymer were obtained which on analysis showed that it comprised 60 mole percent of segments having hydroxy substituents thereon.

Other copolymers within the scope of the present invention may be prepared by using other vinylpyridines and α,β-unsaturated monomers, such as set forth above, in the processes illustrated in the above examples.

It should be noted that in the processes of the present invention the aluminum and boron hydrides hydrogenate the aldehyde, ester and acid groups to provide the hydroxyalkyl substituents, despite the great molecular bulk and steric hindrance of the polymers.

The polymers of the present invention are useful as film-forming materials, mordants, etc. They are especially useful as mordants in the image-receiving elements used in color diffusion transfer processes such as disclosed in U.S. Patent No. 2,983,606, issued May 9, 1961 to Howard G. Rogers.

Since certain changes may be made in the above product and process without departing from the scope of the invention herein involved, it is intended that all matter contained in the above description shall be interpreted as illustrative and not in a limiting sense.

What is claimed is:

1. A process for preparing vinylpyridine copolymers comprising a significant amount of segments having hydroxy substituents thereon, said process consisting essentially of (a) polymerizing a vinylpyridine monomer with a co-monomer selected from the group consisting of polymerizable α,β-unsaturated aliphatic monobasic and dibasic acids, esters of said acids and polymerizable α,β-unsaturated aliphatic aldehydes and (b) hydrogenating, with a metal-containing hydrogenating agent, the acid, ester and aldehyde groups on the resulting copolymer to hydroxyalkyl groups.

2. A process as defined in claim 1 wherein the hydrogenation step is carried out with a reagent selected from the group consisting of aluminum and boron hydrides.

3. A process as defined in claim 1 wherein said co-monomer is a polymerizable α,β-unsaturated aliphatic aldehyde and comprises less than seven carbon atoms.

4. A process as defined in claim 1 wherein said co-monomer is an ester and the acid portion of said ester comprises less than seven carbon atoms.

5. A process as defined in claim 4 wherein said ester is an alkyl ester and the alkyl group of said ester comprises less than seven carbon atoms.

6. A vinylpyridine copolymer consisting essentially of significant amounts of segments selected from the group represented by the formula:

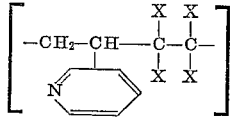

wherein at least one but less than three X's are hydroxyalkyl groups comprising less than four carbon atoms and the remainder of said X's are selected from the group consisting of hydrogen and lower alkyls.

7. A copolymer as defined in claim 6 wherein said hydroxyalkyl groups are selected from the groups consisting of hydroxymethyl and hydroxyethyl groups.

8. A process as defined in claim 2 wherein said reagent is lithium aluminum hydride.

9. A film-forming copolymer consisting essentially of recurring units of 4-vinyl pyridine and 2,3-butenediol in polymerized form.

References Cited

UNITED STATES PATENTS 2,888,436  5/1959  Pritchard _____ 260—86.1

WILLIAM H. SHORT, *Primary Examiner.*

E. M. WOODBERRY, *Assistant Examiner.*